United States Patent [19]

Meade

[11] Patent Number: 4,561,192

[45] Date of Patent: Dec. 31, 1985

[54] SPRAY DRYING APPARATUS AND METHOD

[75] Inventor: Reginald E. Meade, Tulare, Calif.

[73] Assignee: Dairyman's Cooperative Creamery Assoc., Tulare, Calif.

[21] Appl. No.: 654,958

[22] Filed: Sep. 27, 1984

Related U.S. Application Data

[63] Continuation-in-part of Ser. No. 445,051, Nov. 29, 1982, abandoned.

[51] Int. Cl.[4] .............................................. F26B 3/08
[52] U.S. Cl. ........................................ 34/10; 34/57 A; 34/57 R; 34/164; 159/DIG. 3; 159/4.07
[58] Field of Search ............ 34/10, 57 A, 57 B, 57 R, 34/164; 159/4 F, 4 UM, DIG. 3

[56] References Cited

U.S. PATENT DOCUMENTS

| | | | |
|---|---|---|---|
| 1,874,665 | 8/1932 | Voorhies | 159/4 F |
| 2,835,586 | 5/1958 | Peebles | 426/285 |
| 2,941,947 | 6/1960 | Schauer | 159/4 UM |
| 3,295,221 | 1/1967 | Joy | 34/57 A |
| 3,319,344 | 5/1967 | Sachel et al. | 34/57 A |
| 3,547,179 | 12/1970 | Hussmann | 159/4 UM |
| 3,615,723 | 10/1971 | Meade | 426/294 |
| 3,740,865 | 6/1973 | Laguilharre | 34/57 E |
| 3,867,234 | 2/1975 | Smith et al. | 159/4 D |
| 4,305,210 | 12/1981 | Christensen | 34/164 |
| 4,358,341 | 11/1982 | Bergquist | 159/4 F |
| 4,399,350 | 8/1983 | Schneider | 34/164 |

FOREIGN PATENT DOCUMENTS 315885 of 1971 U.S.S.R. ................................ 34/164

Primary Examiner—Larry I. Schwartz
Assistant Examiner—David W. Westphal
Attorney, Agent, or Firm—Flehr, Hohbach, Test, Albritton & Herbert

[57] ABSTRACT

Multi-stage spray drying method to produce spray dried products efficiently in the form of porous clusters of dense individual spheroidal particles bonded together, said clusters or fragments thereof exhibiting rapid wetting and solubility characteristics for reconstituting with water. When fragmented by milling, the product retains free flowing properties and packs in containers requiring less volume for a given shipping weight.

15 Claims, 2 Drawing Figures

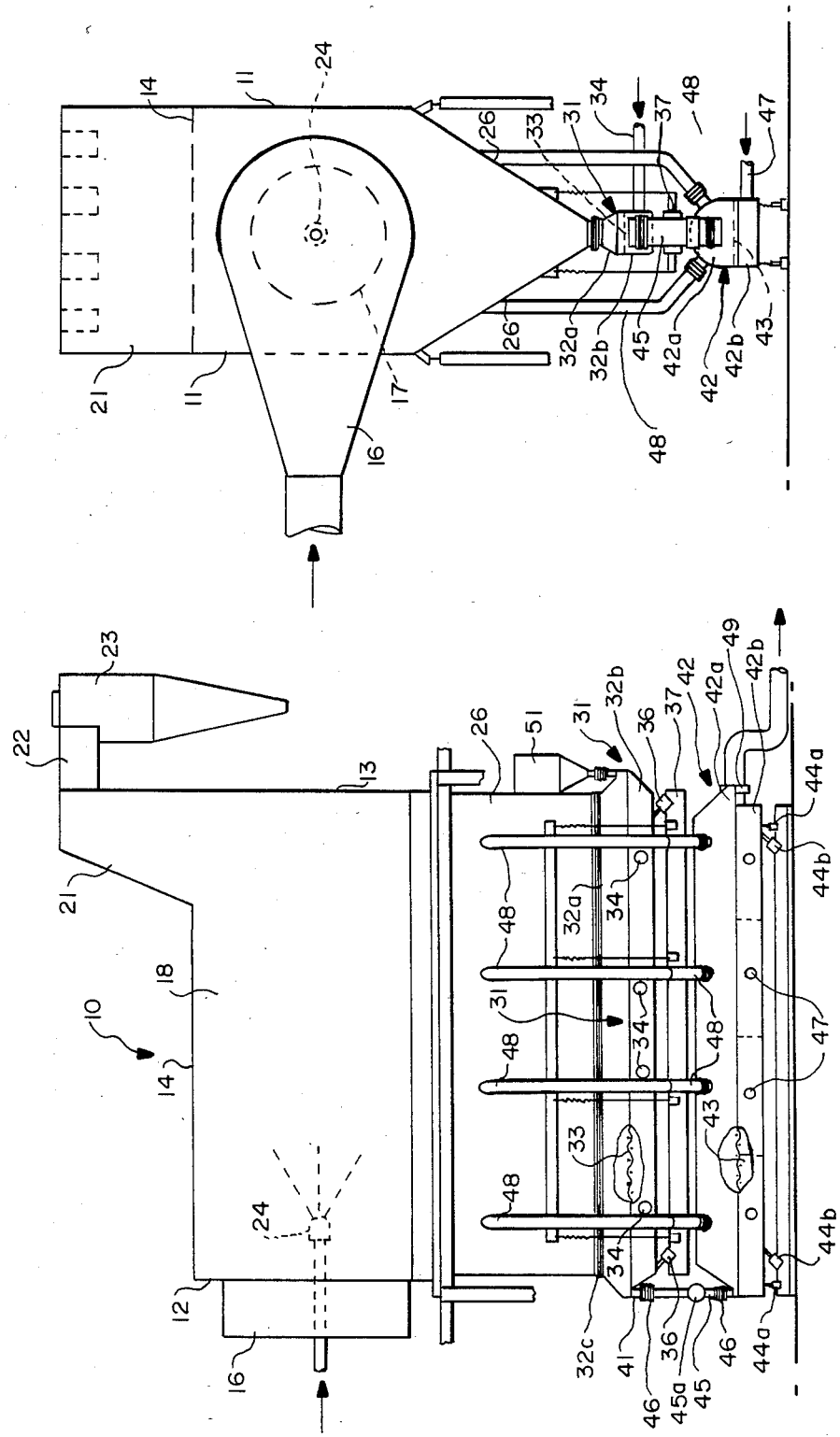

SPRAY DRYING APPARATUS AND METHOD

The present application is a continuation-in-part of my co-pending application Ser. No. 445,051 filed Nov. 29, 1982 now abandoned.

This invention relates generally to apparatus and methods for producing dried particulate products.

Spray drying methods and apparatus are commonly used in a wide variety of industries for producing dried particulate or powder products. For example in the dairy industry spray dryer equipment and methods are used for converting liquid milk or whey to dry powder form. The composition of some materials includes substances tending to impart stickiness during drying, which reduces the drying rate and may destroy their desired identity. In some instances such stickiness or tackiness may be attributed to the presence of a substantial amount of moisture, while in other instances it may be due to the presence of substances such as sugars, fats, oils, waxes, gums, proteins, or other viscous, sticky materials.

U.S. Pat. No. to Peebles 2,835,586, dated May 20, 1958, discloses a spray drying equipment and process in which dispersed atomized particles are caused to be sticky by virtue of their lactose and moisture content. Such stickiness is utilized to cause the formation of porous aggregates by random contacts, and thereafter the porous aggregates are dried to form products that are readily dispersable in water.

The Peebles process is applicable primarily to liquid dairy products, such as liquid whey and liquid milk, and is not applicable to a wide variety of products such as are found in the pharmaceutical and chemical industries. In addition the Peebles apparatus and method is not as economical as is desired, with reference particularly to energy consumption.

As disclosed in Voorhies U.S. Pat. No. 1,874,665, Aug. 30, 1932, screens or filter membranes are incorporated in spray drying apparatus whereby substantial amounts of the atomized material that is not completely dried is caused to deposit on screens or filter mediums through which drying air from the drying chamber is caused to pass, whereby some additional moisture is removed before the material is discharged. The screens or filter membranes are vibrated for the purpose of dislodging accumulated material when its moisture content has been reduced to the desired level. However such equipment and method is subject to the disadvantage that the end product may not be uniform with respect to moisture content, due to the fact that dislodgement of the material from the screens may not occur when the desired moisture content is reached. Also such equipment is difficult to maintain in clean and sanitary condition, and requires frequent shutdown for maintenance and cleaning.

Another spray dryer apparatus and method is disclosed in U.S. Pat. No. 3,615,723, Oct. 26, 1971. In that instance the partially dried atomized material is deposited as a porous mat upon a foraminous belt which moves across the lower portion of the spray dryer chamber. Drying air from the main drying chamber is caused to pass downwardly through the deposited mat, thus removing additional moisture. The material on the conveyor is subjected to further drying after it passes out from the spray drying chamber, and may then be subjected to cooling, after which it is crushed to form the desired particulate dry product. With this apparatus and method the material being deposited upon the foraminous conveyor belt has sufficient moisture and stickiness to form the desired porous mat. With this apparatus there is considerable resistance to the flow of drying medium through the deposited mat upon the conveyor belt, which is a limiting factor of the capacity obtained for a particular size of equipment. In addition, fine powder material which may be deposited upon the conveyor belt, is either enmeshed in the moist mat, or passes through the mat, and appears in the final product. In other words, such fine powder material is not immediately recycled into the main drying chamber, as in the present invention.

It is an object of the present invention to provide a spray drying apparatus and method which is applicable to a wide variety of fluid feed materials, including materials which tend to become sticky or tacky during drying.

Another object is to provide spray drying apparatus and method which is relatively efficient with respect to energy consumption, and has relatively high capacity for equipment of a given size.

Another object of the invention is to provide a spray drying apparatus and method which is relatively simple, and which utilizes relatively available parts for its manufacture.

Another object is to make possible the production of dried products in the form of agglomerates and of relatively high density.

In general the present invention makes use of apparatus consisting of a generally horizontal main drying chamber having duct means for receiving a drying gas such as hot air. Means is provided for introducing the fluid feed material in atomized form into one end portion of the chamber together with the drying gas, such as hot air, whereby the atomized droplets are dispersed in the drying gas to effect preliminary drying. A secondary drying unit of the fluidized bed type extends across and forms the lower end of the main chamber, whereby partially dried particles progressing downwardly from the main drying chamber are received by the secondary drying unit. This unit has a generally horizontal screen which is vibrated whereby material on the screen progresses toward one end of the unit, where the material is discharged. Drying gas is introduced into the unit in the space below the screen, therey maintaining an upward flow of drying gas through the material on the screen. The particulate material deposited upon the screen is maintained as a fluidized bed of material. Preferably a second unit of the fluidized bed type receives and further treats material discharged from the first unit. Fines carried by drying gas leaving the second unit preferably are introduced into the main drying chamber and thereby recycled. The invention also includes a method making use of the foregoing apparatus, in which dry powder material deposited on the fluidized bed is caused to be carried upwardly into the main drying chamber, where it is co-mingled with incompletely dried particles and thereby carried back into the fluidized bed.

Further features and objects of the invention will appear from the following description in which the preferred embodiment has been set forth in detail in conjunction with the accompanying drawing.

REFERRING TO THE DRAWING

FIG. 1 is a side elevational view schematically illustrating apparatus in accordance with the present invention.

FIG. 2 is a view looking toward the left hand end of FIG. 1.

The apparatus illustrated in the drawing consists of a box-like structure 10 formed of upright side walls 11, upright end walls 12 and 13, and the top wall 14. A duct 16 is mounted upon the end wall 12, and communicates with the interior main drying chamber 18. It is desirable that the structure 10 be extended horizontally substantially as illustrated. The duct 16 communicates with suitable means for supplying a drying gas, such as hot air. In a typical instance this means can consist of blower and conventional air heating equipment. A gas so introduced into one end of the chamber 18 through the duct 16 is caused to flow across the upper region of chamber 18, and is exhausted through the extension 21, which extends across the upper wall of the structure at that end remote from the duct 16. Ducts 22 are shown for connecting the extension 21 with dust separating means, such as cyclones 23, or air filters. One or more atomizing nozzles 24 are located centrally of the opening 17 whereby fluid feed under pressure introduced into the nozzles serves to atomize and cause the atomized material to be dispersed in the stream of drying gas introduced through the opening 17. With this arrangement atomized particles are subjected to some drying in the upper part of the chamber 18, with some of the finer partially dried particles being carried to the remote end of the chamber, and other heavier particles gravitating downwardly into the lower portion of chamber 18.

The lower part of the structure 10 is formed by the convergent side walls 26, which in effect forms a trough extending horizontally from one end of structure 10 to the other end.

The lower trough-like open end of the structure 10 directly communicates with a drying unit 31 of the fluid bed type. Commercial units of this type have the upper space above the screen enclosed by a hood or dome. The unit shown consists of a housing having upper and lower parts 32a and 32b, the upper 32a is coupled to the lower end of the structure 10 by flexible sealing means 32c. Also it is open, or in other words, the space within the upper part is unobstructed and open to the lower end of structure 10 for the entire length thereof. Within the housing there is a screen 33 which is mounted between the parts 32a and 32b, and extends for the length of the unit. Air supply conduits 34 communicate with the lower part 32b of the housing, whereby such air or other drying gas is caused to flow upwardly through the screen 33. Vibration imparting actuators 36 impart vibrating movements to the unit and are secured to the housing 31 and also to the weighted counterbalance frame 37. The vibrating arrangement in this instance is such that a fluidized bed of particulate material on the screen 33 is continuously progressed toward the discharge end, which in this instance is at the left end of the unit 31, which corresponds to that end of the structure 10 in which the feed material is introduced. Duct means 41 shown at the left end of the unit 31 in FIG. 1, provides for the discharge of material from the fluidized bed.

In the particular embodiment illustrated in the drawing, the material discharging from the unit 31 is delivered to the feed end of an underlying unit 42, which is likewise of the fluid bed type. The housing of this unit likewise is in upper and lower parts 42a and 42b, with a screen 43 interposed between these parts. The unit is suspended by springs 44a and is vibrated by the actuators, 44b. The discharge duct 41 from the unit 31 communicates with the feed end of the unit 42, through the duct 45, and the connecting flexible couplings 46. A device 45a may be inserted in duct 45 to break up lumps. It may be a simple rotary impact device or a crushing mill that employs crushing rolls. Ducts 47 communicate with the lower housing part 42b and serve to supply a treatment gas (e.g. hot air) which flows upwardly through the screen 43 and the fluidized bed of material. Some of these ducts near the discharge end of unit 42 may supply cooling air to cool the material before it is discharged. Ducts 48 which communicate with the upper housing part 42a, serve to discharge the gas leaving the fluidized bed. They preferably connect with the main chamber and are shown communicating through the sloped walls 26. Particulate material of the fluidized bed in the lower unit 42, progresses toward the right and is discharged through the discharge duct means 49. Fine particulate material carried with the gas discharge from unit 41 through ducts 48 is discharged into the main chamber for recycling, together with fine material carried upwardly from unit 31.

In some instances it is desirable to feed supplemental particulates to the dryers. For this purpose a feed hopper 51 is provided which is arranged to introduce particulate material into the corresponding end of the unit 31 whereby it is co-mingled with the material being deposited on the bed from the main chamber. The product thus introduced may be extraneous particulate material which one may wish to blend with the material being dried, or it may be product produced from the feed material.

A feature of the invention is the manner in which the spray dried material produced in the chamber 18 is continuously removed or unloaded by causing it to be deposited over the relatively large area of the fluid bed of unit 31. This is in contrast with conventional spray drying practice. When the main drying chamber is upright, as in a conventional spray dryer, the spray dried material is removed through a relatively small opening at the lower end of a cone or cylinder and then introduced into the feed end of a secondary dryer. When the drying chamber extends horizontally, as in some prior dryers, the material is collected in the lower end and is removed by various types of mechanical devices such as an augur or feed screw, drag sweep or belt. Such removal or unloading methods, as well as removal by causing the material to be dispersed in high velocity air streams, tend to alter the physical identify of the particles due to friction, compaction and compression forces, particularly when the particles have a moisture content such that all or a part of the material is sticky, cohesive, viscous or semi-liquid. According to the present invention the spray dried particles produced in the main chamber progress from this chamber and are deposited over the entire area of the fluidized bed of dryer 31, thus avoiding or minimizing any undesirable changes in physical identity. The further drying taking place in the fluidized bed of dryer 31 reduces the moisture content to a level such that stickiness of the particles is minimized before final discharge from dryer 31, or before transfer to the feed end of dryer 42. If desired, a mill or like means may be employed to break any lumps in the material being supplied to dryer 42.

In operation, and assuming that the feed material is a whey concentrate, it is pumped to the spray nozzle 24 at a constant rate to produce an atomized spray as schematically shown in FIG. 1. Hot drying gas (e.g. hot air) is continually introduced through duct 16, whereby the atomized particles are dispersed in the drying gas and caused to progress toward the other end of the chamber. During this progression the particulate material falls downwardly by gravity and the moisture content is reduced to a value such that they become sticky. Random contacts between such sticky particles causes formation of aggregates. As the dispersed downwardly progressing material proceeds into the lower portion of the chamber between the sloped walls 26, it is co-mingled with fine material introduced from unit 31 and through ducts 48 whereby such fine and relatively dry particles are caused to contact and adhere to the material progressing downwardly from the upper portion of the main chamber, thus causing such fine material to be recycled. Eventually the material enters the fluidized bed of material in drying unit 31. Here further drying occurs by contact with upwardly flowing drying gas. The material discharges continuously from unit 31 and from thence may be finished dried in unit 42.

Stated in another way, the heated drying atmosphere introduced into the upper portion of structure 10 by way of duct 16 mixes with and entrains liquid particles from the atomizer to form an aerosol system in which water is evaporating from the liquid to form moist, tacky particles. As the aerosol passes through the upper horizontal drying zone, the suspened, tacky particles (usually containing 4–20% moisture) form agglomerates by random contacts with other such particles suspended in the aerosol and some may be deposited on the interior surfaces of the spray dryer or collected on the upper surface of the vibrating fluid bed which is directly exposed to the spray drying zone above. The spray drying conditions above the fluid bed are such that the moisture content of the particles is sufficient to provide a tacky surface but not high enough to cause the particles to coalesce to form a continuous, impermeable film. Additional moist particles are collected by contact with and attachment to particles already deposited on the surfaces of the spray dryer walls or the fluid bed, or to relatively fine particles suspended in a secondary aerosol system entering the spray dryer and fine particles arising from the upper surface of the fluid bed below. This secondary drying atmosphere rising from the fluid bed and entering the lower part of the spray dryer contains less moisture (i.e. lower humidity) than that of the relatively more humid atmosphere of the spray dryer air in the regions above the fluid bed, which at this stage contains moisture that has evaporated from the atomized liquid. The relatively low moisture drying atmosphere flowing upwardly from the fluid bed is thus able to contact the dispersed moist agglomerated clusters of particles above the bed which have been formed as a porous reticulum in which a high proportion of the volume of a cluster consists of a network of empty spaces, exposed surfaces, and permeable channels. The flow of the fluid bed drying atmosphere in contact with the porous agglomerated material continues until the moisture is evaporated to a suitable level, with the individual particles comprising the agglomerates still bonded together at their points of contact. The dry, highly porous granules resulting from this method may be characterized individually as a high bulk, low density cluster of relatively solid, high density spheroidal particles firmly bonded together at points of contact in such manner as to form a network of reticules, channels and void spaces permitting the passage of drying gas therethrough and facilitating the evaporation of moisture therefrom.

The void spaces within the clusters can be characterized by a value referred to as "a void fraction value" (E) and is determined by computing the equation:

$$E = 1 - (ba/Pa)$$

wherein E=void fraction ba=bulk density of cluster

Pa=average density of individual particles

In a completely solid particle, E=0. Conversely, granules or particles with the highest possible void fraction would have a value of E=0.875.

A further unique characteristic is that the individual particles comprising the clusters have little or no void fraction having been formed initially from liquid or highly moist particles under drying conditions which minimize the development of the gas cells or hollow spheres typical of most spray dried particles produced by the methods usually practiced which evaporate all the moisture rapidly in one stage. Such cells or hollow spheres cause particles to float on the surface when mixed with water. Thus, as a result of the properties characterized above, the subject product is more rapidly wetted, dispersible and soluble in water and thereby can be more easily reconstituted to a uniform liquid state, free from lumps or other undissolved aggregates.

In the drying of low melting point materials containing soluble crystallizing components such as lactose and other sugars in which crystallization has not taken place, crystallization is promoted when the material is seeded by contact with dried particles containing the same components that are crystallized to some extent. Such seeding and promoting of crystallization takes place in the aerosol system maintained in the main chamber when fine dried particles from material in the dryer unit 31, and fine dried particles carried into the main chamber through ducts 48 which have crystallized components, are co-mingled with and become attached to the partially dried particles in which such components are not crystallized.

Examples of the invention are as follows:

EXAMPLE 1

The equipment employed was substantially as shown in the drawing. The feed was dairy cheese whey concentrated to 52% solids. The main chamber was about 35 feet in length and 18 feet in width. The height from the top wall down to the sloped walls 26 was about 16 feet and for the lower part between the sloped walls 26 about 14 feet, the walls being sloped at an angle of 30° to the vertical. The whey concentrate, at a temperature of about 40° F. was fed to the spray nozzle 24 at the rate of 20 gallons per minute. Hot drying air was supplied through duct 16 at a temperature of about 330° F. and at the rate of about 60,000 cubic feet per minute. Both units 31 and 42 were maintained in operation with drying gas at a temperature of about 180° F. being supplied to unit 31 at the rate of about 8,000 cubic feet per minute, and air supplied to unit 42 at a temperature of about 220° F. and at the rate of about 12,000 cubic feet per minute. Samples of material taken in a region near the fluidized bed of material on the screen of unit 31, revealed that most of the particles were in the form of agglomerates having a moisture content of about 9.7% and were found to have an E value of 0.79. The fluidized bed of material on the screen of unit 31 was about 4-5 inches in depth and relatively evenly distributed over the screen area. Samples of material discharging from unit 31 had a moisture content of about 5.8% and were found to have an E value of 0.76. Samples of material discharging from unit 42 had a total moisture content of about 2.9% with an E value of 0.65. The agglomerate form of the final product was retained. The bulk density was about 0.21 gms/cc. The partical size distribution was such that 87% of the material remained upon a 20 mesh screen (Standard U.S.) and 5% passed through a 30 mesh screen. Some fine particles of material were carried in the upward air flow from unit 31, and also in the air flow from unit 42, which passed through ducts 48 into the lower part of the main chamber. All such material was recycled in that it comingled with the dispersed moist and somewhat sticky material in the region between the sloped walls 26, and thereby caused to adhere to and become a part of material entering the fluidized bed of unit 31. It was estimated that this reduced the amount of fine particulate material being discharged through duct 21 by from 25 to 30% and materially contributed to economical operation.

Microscopic examination of the final product of the above example revealed that the individual particles of the agglomerates were dense, as distinguished from the hollow sphere and broken sphere fragment form which is produced by conventional spray drying. Thus, before milling or sizing, the major part of the final product was in the form of agglomerates. The bulk density was relatively low, being 0.31–0.42 mg/cc. Sizing of the final product as by passing through a mill or sizing rolls and screening, produced material having aggregates of smaller size and increased bulk density. For example, material sized whereby 100% passed through a 20 mesh screen, had a bulk density of 0.65 gms/cc.

EXAMPLE 2

For comparative purposes, skim milk concentrated to 43% solids was processed at high and low evaporation and feed rates in the horizontal spray dryer using the same temperature and quantity of hot air for drying the atomized particles. The drying air flow rate was 40,000 cfm in both instances. This air traveled horizontally for 30-35 feet at an average velocity of 120 fpm for a period of 15 to 20 seconds, after which it left the drying zone, passing through a filter which removed entrained particles which were thus removed from the drying zone.

In both tests of Example 2 samples of product were collected separately at the bottom of the spray drying zone in the area where the product is deposited on the upper surface of the fluid bed, and also samples of the product leaving the fluid bed. Simultaneously samples of product were also collected from the entrained material removed by an air filter from air discharging from the end of chamber 18. All the material from both tests was collected for a production period of 1 hour and measured volumes were weighed. Composite samples of each of the four product segments were obtained and analyzed. The results are tabulated and compared in attached Tables I and II.

Except for tests to determine densities, the Testing Procedures for Values in Table II were methods described and published by the American Dry Milk Institute, Inc., 130 North Franklin Street, Chicago, Ill. 60606, the publication being Bulletin 916 (revised 1971) entitled "The Standards for Grades of Dry Milk Including Methods of Analysis." Densities noted in Table II were determined as follows. "Bulk densities in grams per cubic centimeters were determined by placing a sufficient amount of sifted particles to fill a 250 milliliter graduated cylinder to a volume of 200 milliliters. Loose bulk densities were determined by ascertaining the weight of the particles on a 200 milliliter basis (i.e., weight in grams divided by 200 cubic centimeters equals bulk density). Packed bulk densities were obtained by repeatedly dropping the graduated cylinder previously filled to a 200 milliliter volume from a height of $\frac{1}{8}$ inch upon a hard surface until a constant volume reading was obtained (i.e., until no further decrease in volume occurs by additional free falls or dropping of the cylinder). Average particle density (grams/cubic centimeter) represents the average particle weight in relation to the volume of the particles. Thus, more porous particles provide a lesser particle density than particles of a lesser porosity. Average particle density of tested material as referred to herein was ascertained by a Beckman Model No. 930 air comparison pycnometer. Employing the air comparison pycnometer, average particle density is ascertained by the equation:

$$\text{Average particle density (grams/cubic centimeter)} = \frac{\text{Sample weight in grams}}{\text{Instrument reading in cubic centimeters}}$$

After collection, representative portions of each test were milled and packed in a standard bag (16"×14"×32½") regularly used to pack 50 lbs. of spray dried NDM from typical spray dryers.

TABLE I

| OPERATING DATA Two 1-Hour Tests | TEST 1 FLUID BED | LOW RATE FILTER | TEST 2 FLUID BED | HIGH RATE FILTER |
|---|---|---|---|---|
| Feed Rate | | | | |
| Concentrated skim milk at 40% solids, lbs/hr. | 7,000 | 7,000 | 10,000 | 10,000 |
| Atomizer motor load amps. | 60 | 60 | 72 | 72 |
| Evaporation Rate lbs water per hr. | 4,200 | 4,200 | 6,000 | 6,000 |
| Dry Product Rate lbs output per hr. | 2,800 | 2,800 | 4,000 | 4,000 |
| Dry Air Input, CFM | 40,000 | 40,000 | 40,000 | 40,000 |
| Air inlet temp. = F. | 385 | 385 | 385 | 385 |
| Air discharge temp. | 185 | 185 | 135 | 135 |
| Dry Product Portions Collected in hr. | | | | |
| test lbs | 560 | 2,240 | 3,000 | 1,000 |
| % | 20 | 80 | 75 | 25 |

(Data from test April 28-30, 1984)

TABLE II

| ANALYTICAL DATA Two 1-Hour Tests | TEST 1 FLUID BED | LOW RATE FILTER | TEST 2 FLUID BED | HIGH RATE FILTER |
|---|---|---|---|---|
| Moisture % | | | | |
| At bottom of spray dryer | 4.4 | | 6.1 | |
| Separated final products | 1.2 | 4.2 | 2.8 | 5.0 |
| Blended sample from fluid bed & filter | 3.60 | | 3.35 | |
| Bulk density | 0.56 | 0.60 | 0.31 | 0.42 |

TABLE II-continued

| ANALYTICAL DATA Two 1-Hour Tests | TEST 1 FLUID BED | LOW RATE FILTER | TEST 2 FLUID BED | HIGH RATE FILTER |
|---|---|---|---|---|
| Average individual particle density | 1.17 | 1.15 | 1.37 | 1.25 |
| E (void fraction value) for unpacked sample | 0.48 | 0.46 | 0.72 | 0.67 |
| Dispersibility (blended sample from fluid bed & filter) | 76.4 | | 90.2 | |
| Solubility index blend Packed density for blended portion each test. | 0.10 | | 0.10 | |
| Weight of product lbs packed in standard 50 lb. bag for NDM (dimensions 16" × 4" × 32½") | 50–52 | | 60–63 | |

(Data from tests April 28–30, 1984)

What is claimed is:

1. Spray drying apparatus comprising a horizontally extended structure having a main drying chamber, atomizer means for introducing a fluid feed material in the form of atomized particles into the upper portion of the chamber adjacent one end of the same, means for introducing drying gas into said end portion of the chamber and in a general horizontal direction, whereby the atomized particles are dispersed in the drying gas to effect drying of the particles, a secondary drying unit of the fluidized bed type enclosing and extending below the lower end of the chamber and having its upper side open thereto for substantially the horizontal length of the chamber, whereby particulate material progressing downwardly through the main drying chamber is received in a fluidized bed of such material in the secondary drying unit, the secondary drying unit having a generally horizontal screen upon which particulate material is deposited and the fluidized bed maintained, one end portion of the unit having means for discharging the particulate material, the unit having means for vibrating the screen to cause the fluidized bed of material thereon to progress toward the discharge end, duct means for discharging gas from the upper portion of the main chamber, and means for supplying drying gas to the secondary drying unit whereby such gas flows upwardly through the screen and fluidized bed of material thereon and from thence upwardly through the main drying chamber.

2. Apparatus as in claim 1 together with a second fluidized bed dryer unit, the second unit having one end thereof disposed to receive material from the first mentioned secondary drying unit.

3. Apparatus as in claim 2 in which said second fluidized bed dryer unit is disposed directly below the first unit.

4. Apparatus as in claim 1 in which lower side wall portions of the structure are convergent to form a trough extending horizontally from one end of the structure to the other end, the trough overlying the secondary drying unit.

5. Apparatus as in claim 2 or 4 in which drying gas is supplied to the second drying unit and duct means conducts gas carrying fine material discharging from the second unit and introduces the same into the main chamber.

6. Apparatus as in claim 1 in which said duct means for discharging gas from the main chamber is located at the end of the chamber that is horizontally remote from the said one end portion of the chamber.

7. A method of drying a fluid feed material making use of spray drying apparatus having a structure forming a horizontally extended main drying chamber with means for introducing drying gas and for introducing atomized particles of the feed material and for dispersing the particles in the gas, and means for discharging gas from the main drying chamber, the apparatus also including a unit of the fluidized bed type having a generally horizontal screen that is vibrated, the method comprising causing the atomized particles of the fluid bed to be introduced into one end portion of the main drying chamber and to be dispersed in the drying gas to partially dry the atomized particles, the drying gas being directed horizontally into the upper portion of the main drying chamber, causing the partially dried particles to progress downwardly without obstruction to form a fluidized bed extending over the screen of said fluidized bed unit, supplying drying gas to said unit below the screen thereof whereby such gas progresses upwardly through the screen and the partially dried particles forming the fluidized bed of material thereon and from thence upwardly into the main chamber, continuously causing the finer powder particles of the fluidized bed to be separated from the fluidized bed by the drying gas progressing upwardly through the fluidized bed, co-mingling in the main drying chamber such finer particles with the atomized and partially dried material whereby such finer particles are caused to adhere to partially dried dispersed particles and returned to the fluidized bed, and continually discharging material from one end of the fluidized bed.

8. A method as in claim 7 in which the material discharged from the fluidized bed is subjected to further treatment in contact with a drying gas.

9. A method as in claim 8 in which the further treatment is carried out by contacting the particles with a drying gas in a second unit of the fluidized bed type.

10. A method as in claim 9 in which gas discharging from the second unit together with fines is introduced into the main chamber whereby such fines are recycled.

11. A method as in claim 7 in which the feed material contains crystallizable components.

12. A method as in claim 7 in which the feed material contains components tending to impart stickiness to the partially dried atomized particles whereby random contacts between such sticky particles form aggregates, the material deposited in the fluidized bed of said unit being such aggregates together with some fine powder material, the fine powder material being removed from the fluidized bed by drying gas progressing upwardly through the same and co-mingled with the material in the main chamber to cause the same to adhere to partially dried and sticky particulates therein, thereby forming aggregates that are deposited in the fluidized bed.

13. A method as in claim 12 in which the feed material is dairy cheese whey.

14. A method as in claim 7 in which the dispersed particulate material in the main drying chamber is continuously deposited over substantially the entire area of the fluidized bed, and in which the fluidized bed of material is progressed toward that portion of the chamber underlying said one end portion, where it is discharged from the unit.

15. A method as in claim 14 in which the fluidized bed is extended horizontally and the screen is vibrated to cause material to progress toward and to be discharged continuously from said one end of the bed.

* * * * *